Sept. 22, 1964    H. C. KAEDING    3,150,307
SOLID STATE CONTROLLED RECTIFIER CIRCUITS AND APPARATUS
Filed Sept. 17, 1962
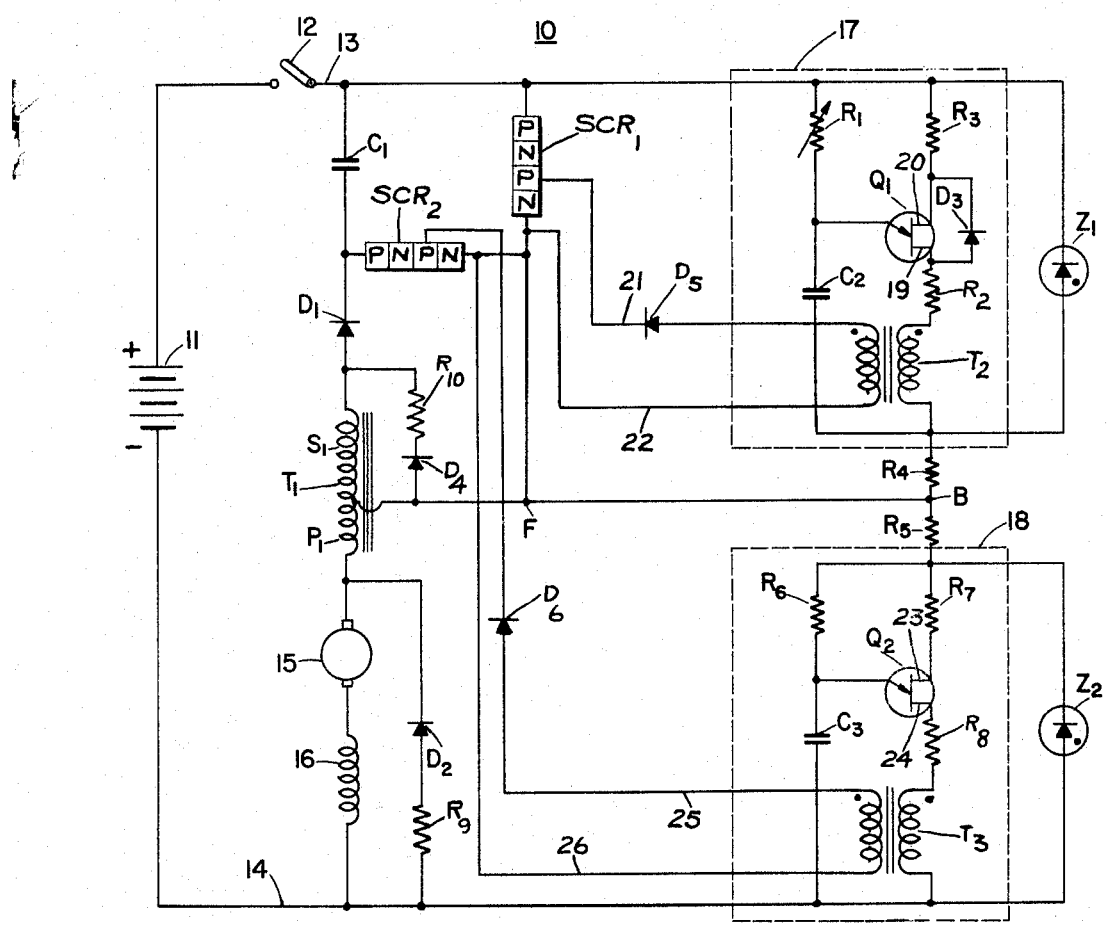
INVENTOR.
Hugo C. Kaeding,
BY Henry J. Marciniak
Attorney.

3,150,307
SOLID STATE CONTROLLED RECTIFIER CIRCUITS AND APPARATUS

Hugo C. Kaeding, Fort Wayne, Ind., assignor to General Electric Company, a corporation of New York
Filed Sept. 17, 1962, Ser. No. 224,114
1 Claim. (Cl. 318—345)

This invention relates to solid state controlled rectifier circuits and apparatus. More particularly, it relates to such circuits and apparatus for controlling the average power to a load, such as a motor, operated from a direct current source.

The power supplied to a load operated from a battery or a filtered rectified alternating source may be selectively varied by controlling the average power applied to the motor with solid state power devices, which are switched on at selected frequencies to provide controlled pulses of current to the load. Where a solid state controlled rectifier is used as a power device in conjunction with a battery to supply power, it is not only necessary to switch the rectifier into a conducting state but also to commutate the controlled rectifier.

After a signal is applied at the gate of a silicon controlled rectifier, it will conduct in a forward direction and continue to conduct after the gate signal is removed. In order that the firing circuit may regain control of the controlled rectifier, it is necessary to reduce the anode voltage to zero or to apply a reverse bias for a short interval of time in order to turn off the controlled rectifier. When silicon controlled rectifiers are used in conjunction with cyclical power supplies, such as an unfiltered rectified power source or an alternating power source, the reduction of the voltage to zero at the end of each half cycle or the reversal of the voltage of an alternating source may be used to turn off or commutate the controlled rectifier and thereby permit the firing circuit to regain control of the power device.

Heretofore, difficulties have been encountered in designing control circuits for selectively controlling loads such as D.C. motors operated from a battery or a filtered alternating supply, where silicon controlled rectifiers are employed to control the power supplied to the motor and to achieve commutation. Synchronization between the firing signal supplied to the controlled rectifier used as the power control device and the firing signal supplied to the controlled rectifier used to commutate the power device has been too difficult to achieve in practice. When these firing signals are not properly synchronized, the power device may fail to commutate, and effective control of the power supplied to the load is lost.

Silicon controlled rectifiers and their associated firing circuits are sensitive to the effect of circuit transients. Frequently, as a result of such circuit transients, the controlled rectifiers may be misfired or they may fail to commutate. As a consequence, power may be delivered to a load at a time when it is not needed or wanted. In applications where the motor is used to drive a vehicle, an accidental firing of a silicon controlled rectifier may cause the vehicle to move unexpectedly and cause injury to personnel. It is desirable, therefore, to provide a control circuit employing solid state controlled rectifiers wherein provision is made for positively insuring against misfirings or a failure of the controlled rectifiers to commutate.

Accordingly, it is the general object of the present invention to provide an improved control circuit and apparatus employing solid state power devices for supplying power from a direct current source, such as a battery, to a load.

It is another object of the invention to provide an improved control circuit employing silicon controlled rectifiers for operating a motor whereby failures to commutate and misfirings of the solid state controlled rectifiers are effectively minimized.

A more specific object of the present invention is to provide an improved control circuit employing silicon controlled rectifiers for selectively varying the speed of a motor.

In accordance with one form of my invention, I have provided an improved control circuit for selectively varying the average power supplied to a load from a potential source. A first solid state power device having a plurality of semi-conducting material zones of P and N types forming more than two P-N junctions, is fired at selected frequencies to control the power supplied to the load. The end zones of the first device are connected in series with the source and the load whereby current is supplied to the load when the intermediate junction of the device is forwardly biased and current to the load is blocked when the intermediate junction is biased in a reverse direction. A first firing circuit means is coupled with the first device to supply a firing pulse to the intermediate zone at a selected frequency. The first firing circuit means is connected in circuit across the end zones of the first device so that it is operative in the circuit only when the first device is in a blocking state.

A second solid state power device similar in construction to the first device is included in the circuit and has one of its end zones connected in circuit with an end zone of the first device. A capacitor is provided having one side connected with one end zone of the first device and having the other side connected with one end zone of the second device. The said other side of the capacitor is positive with respect to the one side when the first device conducts.

A second firing circuit means is connected in circuit with the first device whereby the second firing circuit means is operative only when the first device is in a conducting state. This second firing circuit means is coupled with the intermediate junction of the second device. When the intermediate junction of the second device is forwardly biased, the second device conducts and the capacitor is discharged to cause the first device to revert to a blocking state.

In a more specific form of my invention, I have provided an improved control circuit for selectively varying the average power supplied to a motor from a direct current source. A first solid state controlled rectifier is connected in a series circuit with the armature of the motor, and is fired at a selected frequency by a firing circuit whereby controlled pulses of power are supplied to operate the motor. A commutating capacitor is connected across the first controlled rectifier and is discharged by a second controlled rectifier at a predetermined interval after the first controlled rectifier is switched into a conducting state to commutate the first controlled rectifier. A second firing circuit is coupled with the second controlled rectifier and is connected in the conducting path of the first controlled rectifier so that it is operative only when the first controlled rectifier is in a conducting state. Also, to further insure the controlled rectifiers are properly switched "on" and "off," the first firing circuit is connected across the first controlled rectifier. When the first controlled rectifier is in a conducting state, the first firing circuit is in effect short-circuited and is inoperative. Thus, the first firing circuit is operative only when the first controlled rectifier is in a blocking state and the second firing circuit is operative only when the first controlled rectifier is in a conducting state thereby minimizing possible misfirings of the controlled rectifiers and failures of the controlled rectifiers to commutate that might adversely affect the control of the motor speed.

According to another aspect of my invention, I have provided an impedance element, such as a resistor, in series circuit with a free-wheeling diode connected in shunt with the motor armature. It was found that this impedance element had a dynamic braking action on a shunt motor when the motor was operated as a generator. For example, when the control circuit was used to operate a drive motor for an electric caddy cart, the impedance element in conjunction with free-wheeling diode provided a braking action when the caddy cart moved in a reverse direction due to a steep slope and caused the motor to operate as a generator. This braking action was sufficient to prevent the cart from suddenly running away in a reverse direction and to allow the operator time to regain control of the drive motor.

The subject matter which I regard as my invention is set forth in the appended claim. The invention itself, however, together with further objects and advantages thereof may be understood by referring to the following description taken in connection with the accompanying drawing which is a schematic circuit diagram of an improved control circuit for a D.C. motor embodying one form of my invention.

Referring now to the drawing in more detail, the control circuit or apparatus shown therein is generally identified by the reference numeral 10 and is adapted for connection to a suitable direct current source, such as a battery 11 or a filtered rectified A.C. supply. The apparatus 10 is connected in circuit with the direct current source 11 through a switch 12 and an input means comprised of terminal leads 13, 14.

In the illustrated exemplification of the invention, the control circuit or apparatus 10 is used to control the speed of a D.C. motor, which is shown schematically by the armature 15 and a serially connected field winding 16. It will be understood that the control circuit 10 may be used to selectively vary the average power supplied to other loads.

The speed of the motor is controlled by varying the frequency of the current pulses supplied to the armature 15 and field winding 16. The frequency of the current pulses is controlled by a silicon controlled rectifier $SCR_1$ and its associated firing circuit 17 shown enclosed in the dashed rectangle. The duration of these pulses is controlled by another silicon controlled rectifier $SCR_2$, its associated firing circuit 18 shown enclosed in a dashed rectangle, and a commutating capacitor $C_1$. Although in the illustrated exemplifiation of the invention, the duration of the current pulses is fixed, it will be appreciated that the duration may be varied, if desirable, by varying the rate at which firing pulses are provided by firing circuit 18.

In accordance with the improved control circuit of the present invention, the firing circuit 17 is operative or effectively energized only during the interval that controlled rectifier $SCR_1$ is in a blocking state, and firing circuit 18 is operative or effectively energized only during the interval the controlled rectifier $SCR_1$ is in a conducting state. The commutating arrangement for the controlled rectifier $SCR_1$ includes the commutating capacitor $C_1$, controlled rectifier $SCR_2$, diode $D_1$ and the transformer $T_1$. The commutating capacitor $C_1$ and the controlled rectifier $SCR_2$ are connected across the controlled rectifier $SCR_1$ so that the capacitor $C_1$ is discharged when the controlled rectifier $SCR_2$ is switched on. The capacitor $C_1$ is charged through diode $D_1$ with the current induced in the secondary of the transformer $T_1$. With this circuit arrangement, it is possible to use a smaller commutating capacitor $C_1$ since full load current is not handled by it. The commutating capacitor $C_1$ has to store only sufficient energy required for the commutation of the controlled rectifier $SCR_1$.

The general arrangement of a capacitor and a second controlled rectifier to effect commutation of a first controlled rectifier is described at pages 112 to 119 of the publication entitled "The General Electric Controlled Rectifier Manual" (first edition, 1960) published by the Semiconductor Products Department, General Electric Company, Syracuse, New York. But as will be hereinafter more fully explained, the present invention provides an improvement in the control of the commutation whereby failure to commutate and misfiring of the controlled rectifiers are minimized.

As the armature current increases, it will be appreciated that the current handled by the controlled rectifier $SCR_1$ increases and that the amount of energy required to commutate the controlled rectifier $SCR_1$ will also be increased. Due to the transformer action of the transformer $T_1$, more energy is stored in the commutating capacitor $C_1$ as the current handled by the controlled rectifier $SCR_1$ increases. Consequently, energy stored in the commutating capacitor $C_1$ is varied to meet the requirements of controlled rectifier $SCR_1$ as load conditions vary.

In order to provide a path for the inductive decay current of the armature 15 and field winding 16 when the controlled rectifier $SCR_1$ is turned off, a free-wheeling diode $D_2$ is connected in shunt with the armature 15 and field winding 16. The free-wheeling diode $D_2$ permits this current to flow in a closed loop.

An impedance element, a resistor $R_9$, was connected in circuit with the free-wheeling diode $D_2$ to provide a load for the armature 15 when it was driven as a generator. It was found that when the motor armature 15 was used to drive a caddy cart, the resistor $R_9$ in conjunction with the diode $D_2$ provided a dynamic braking action to arrest the movement of the motor when it was driven by the wheels of the caddy cart. Thus, when the caddy cart suddenly moved in a reverse direction due to its own momentum, as frequently occurs where the caddy cart is operated on steep slopes, the arrangement of the impedance element $R_9$ and free-wheeling diode $D_2$ arrested the backward movement of the vehicle to permit the operator to regain control of the vehicle with the motor.

The silicon controlled rectifiers $SCR_1$ and $SCR_2$ are essentially PNPN semiconductor devices. They are formed of a plurality of semiconductor zones of P and N type material forming P-N junctions. It will be noted that in the devices used in the exemplification of the invention three junctions were employed. In the drawing, the anode of the silicon controlled rectifiers $SCR_1$ and $SCR_2$ is represented by the connection at the zone end zone of P-type material, the cathode is represented by the connection at the end zone of N-type material, and the gate of the controlled rectifier is represented by the connection at an intermediate zone of the P-type material of the controlled rectifiers $SCR_1$, $SCR_2$.

It will be appreciated that the potential from the direct current source 11 is normally insufficient to bias the controlled rectifiers $SCR_1$, $SCR_2$ into conduction, and a signal must be applied at the gates of the silicon controlled rectifiers $SCR_1$, $SCR_2$ to cause the intermediate junction of the controlled rectifiers to be biased in a forward direction and switch the rectifiers into a conducting state. To turn off controlled rectifiers $SCR_1$ and $SCR_2$ and thereby permit the gate of the controlled rectifier to regain control, it is necessary that the anode voltage of the controlled rectifier be reduced to zero or a reverse bias be applied across the end zones for a finite length of time. In the illustrated exemplification of the invention, the discharge of the commutating capacitor $C_1$ by controlled rectifier $SCR_2$ causes controlled rectifier $SCR_1$ to be reversely biased across the end zones. It will be noted that when the controlled rectifier $SCR_1$ is in a conducting state, current will flow to the commutating capacitor $C_1$ through the secondary winding $S_1$ and diode $D_1$. The voltage across the capacitor $C_1$ will be such that the lower end thereof, as seen in FIGURE 1 is positive with respect to the other end. Thus, when the controlled rectifier $SCR_2$ is switched into conduction, the commutating capacitor $C_1$ discharges to stop the conduction of the controlled rectifier $SCR_1$.

A serially connected resistor $R_{10}$ and diode $D_4$ are connected in shunt with the secondary winding $S_1$ to provide a path for the inductive decay current of transformer $T_1$ as the load current is turned off by controlled rectifier $SCR_1$. When the current in the primary $P_1$ is cut off, the inductive decay current results in a voltage across the secondary $S_1$ that is opposite in polarity to the normally induced secondary voltage. Thus, diode $D_4$ is forward biased and provides a shunt path for the decay current.

The output of firing circuit 17 is coupled with controlled rectifier $SCR_1$ to provide pulses at the gate of controlled rectifier $SCR_1$. The frequency of these pulses is determined by the setting of the variable resistor $R_1$ which serves as the speed control means. The firing circuit 17 is essentially a relaxation oscillator with its input connected across the controlled rectifier $SCR_1$ and includes a unijunction transistor $Q_1$, resistors $R_2$ and $R_3$ connected with the base-one and base-two electrodes 19, 20, respectively of transistor $Q_1$, a charging capacitor $C_2$, diode $D_3$ and a pulse transformer $T_2$.

The Zener diode $Z_1$ is connected across the firing circuit 17 in order to limit the voltage applied across the firing circuit to the reverse breakdown voltage of the Zener diode $Z_1$. It will be appreciated that for voltages below the breakdown value, the Zener diode $Z_1$ acts as a rectifier and when the reverse voltage exceeds the breakdown value the Zener diode $Z_1$ presents a very low resistance. The Zener diode used in the exemplification of the invention had a reverse breakdown voltage of 27 volts and the battery 11 was rated at 36 volts. The voltage drop across the resistor $R_4$ was used to make up the difference between the 27 volts across the Zener diode $Z_1$ and the source voltage. Resistor $R_5$ performs a similar function for firing circuit 18. Preferably, resistor $R_4$, $R_5$ are separate resistors since with a single resistor used in the connection between points B and F, it was found that a certain amount of feedback occurred between the firing circuits 17, 18.

The rate at which the charging capacitor $C_2$ is charged to the peak emitter voltage of the unijunction transistor $Q_1$ determines the frequency at which the unijunction transistor $Q_1$ is fired. When unijunction transistor $Q_1$ is fired, the capacitor $C_2$ is discharged and a pulse of current is induced in the secondary of the pulse transformer $T_2$, which is applied by leads 21 and 22 across the gate and cathode of the controlled rectifier $SCR_1$. Thus, when unijunction transistor $Q_1$ is fired, controlled rectifier $SCR_1$ is triggered into conduction.

Resistor $R_2$ controls the discharge rate of the capacitor $C_2$ while resistor $R_3$ compensates for temperature changes in transistor $Q_1$. A diode $D_3$ was used to protect the unijunction transistor $Q_2$ against transient voltages which might damage the transistor $Q_2$. A diode $D_5$ was provided to prevent the inverse voltage from being applied at the gate.

Firing circuit 18 is also essentially a relaxation oscillator and is similar in its configuration to firing circuit 17. Firing circuit 18 includes a unijunction transistor $Q_2$, resistor $R_6$, resistors $R_7$, $R_8$, connected to base-one and base-two electrodes 23, 24, a charging capacitor $C_3$ and a pulse transformer $T_3$. When the voltage across the capacitor $C_3$ reaches the peak point value of the unijunction transistor $Q_2$, unijunction transistor $Q_2$ is fired causing the capacitor $C_3$ to discharge. Hence, a pulse is induced across the secondary of the pulse transformer $T_3$ to fire controlled rectifier $SCR_2$.

Leads 25 and 26 couple the output of firing circuit 18 with the controlled rectifier $SCR_2$ and apply pulses of current at the gate. Diode $D_6$ prevents an inverse voltage from being applied across the gate and cathode. The Zener diode $Z_2$ maintains the voltage across the firing circuit 18 at substantially the breakdown level of the Zener diode $Z_2$.

The operation of the speed control circuit or apparatus 10 is initiated by closing the switch 12. With switch 12 in the closed position, current will flow through the speed control variable resistor $R_1$ to the charging capacitor $C_2$. When the voltage across capacitor $C_2$ reaches the peak point value of the unijunction transistor $Q_1$, the resistance between the emitter and base-one electrode 19 falls off to a low value and causes the capactor $C_2$ to discharge. The discharge current from capacitor $C_2$ produces a pulse across the primary of pulse transformer $T_2$. A positive firing pulse is supplied at the gate of the silicon controlled rectifier $SCR_1$, and controlled rectifier $SCR_1$ is switched into a conducting state.

When controlled rectifier $SCR_1$ is in a conducting state, it will be seen that the firing circuit 17 is in effect shorted out and firing circuit 18 is now energized. It will be noted that the primary $P_1$, the serially connected armature 15 and field winding 16, and firing circuit 18 are in the conducting path of the controlled rectifier $SCR_1$. Thus, when controlled rectifier $SCR_1$ conducts, these components of the circuit are energized. Current is now being supplied in a path from the D.C. source 11 through input lead 13, the controlled rectifier $SCR_1$, through the primary winding of the transformer $T_1$, the armature 15, the field winding 16, the input terminal lead 14 and to the negative side of the battery 11. Also, the commutating capacitor $C_1$ is charged by the current induced in the secondary of the transformer $T_1$ through diode $D_1$. In the hereinafter to be described exemplification of the invention, the capacitor $C_1$ was charged to a plus 80 volts with respect to the positive side of the battery.

At the instant that the controlled rectifier $SCR_2$ is fired, the timing cycle of the second firing circuit 18 begins. Controlled rectifier $SCR_2$ is fired a predetermined interval after controlled rectifier $SCR_1$ is turned on. This interval is determined by the RC constant of the serially connected resistor $R_6$ and capacitor $C_3$.

As was previously mentioned, if it is desired to vary the conduction period of the controlled rectifier $SCR_1$, in addition to frequency at which it is fired, resistor $R_6$ may be a variable resistor. When capacitor $C_3$ reaches the peak point value of the unijunction transistor $Q_2$, the resistance between the emitter and the base-one electrode 23 drops off causing the capacitor $C_3$ to discharge. As a result, a current pulse is generated in the secondary of the pulse transformer $T_3$, and controlled rectifier $SCR_2$ is switched into conducting state. When controlled rectifier $SCR_2$ is in a conducting state, it causes commutating capacitor $C_1$ to be discharged. Thus, the cathode of the controlled rectifier $SCR_1$ is rendered more positive than the anode and controlled rectifier $SCR_1$ is reversely biased thereby turning it off.

When controlled rectfier $SCR_1$ is turned off, firing circuit 17 is again energized and operative, and firing circuit 18 is in effect deenergized or rendered inoperative. Capacitor $C_2$ of firing circuit 17 is again charged and the cycle repeats itself. The speed of the armature 15 is readily varied by changing the frequency of the current pulses supplied to the armature as determined by the control setting of the variable resistor $R_1$.

The control circuit shown in the drawing was constructed to operate a D.C. motor rated at 1½ horsepower. The following circuit components used are given by way of a specific example of the invention and not by way of limitation thereof:

Battery 11 _____ 36 volts.
Controlled rectifier $SCR_1$ ___ General Electric C50B silicon controlled rectifier.
Controlled rectifier $SCR_2$ ___ General Electric C35B silicon controlled rectifier.
Resistor $R_1$ _____ 250,000 ohms.
Resistor $R_2$ _____ 10 ohms.
Resistor $R_3$ _____ 3,900 ohms.
Resistor $R_4$ _____ 5,600 ohms.
Resistor $R_5$ _____ 5,600 ohms.

| | |
|---|---|
| Resistor $R_6$ | 30,000 ohms. |
| Resistor $R_7$ | 3,900 ohms. |
| Resistor $R_8$ | 10 ohms. |
| Capacitor $C_1$ | 120 microfarads. |
| Capacitor $C_2$ | .06 microfarad. |
| Capacitor $C_3$ | .33 microfarad. |
| Transformer $T_1$ | G.E. 9T45Y7009 transformer. |
| Transformer $T_2$ | G.E. 9T41Y1 pulse transformer. |
| Transformer $T_3$ | G.E. 9T41Y1 pulse transformer. |
| Diode $D_1$ | 1N2157. |
| Diode $D_2$ | 1N2157. |
| Zener diode $Z_1$ | 27 volts, 1 watt. |
| Zener diode $Z_2$ | 27 volts, 1 watt. |
| Unijunction transistors $Q_1$, $Q_2$ | 2N492. |

The motor control circuit 10 employing the foregoing circuit components operated the motor with unidirectional pulses of current at a frequency range between 29 and 400 cycles per second. The speed was varied and reliably maintained between zero and 2,800 revolutions per minute.

From the foregoing description of the operation of the speed control circuit 10, it will be apparent that the firing circuit 18 which controls the controlled rectifier $SCR_2$ is energized only during the interval that the controlled rectifier $SCR_1$ is conducting. Further, during this interval, the firing circuit 17 which controls the controlled rectifier $SCR_1$ is essentially inoperative. Conversely, when the controlled rectifier $SCR_1$ is in a blocking state, firing circuit 17 is operative while firing circuit 18 is not. With such an arrangement, it was found that synchronization between the firing times of the controlled rectifier $SCR_1$, $SCR_2$ is insured. Thus, the possibility of either controlled rectifiers $SCR_1$ or $SCR_2$ being misfired is effectively minimized. An important advantage of such an arrangement is that precise and reliable control is achieved over the motor or other load energized by the control circuit. Because of this advantage, the invention was particularly useful in controlling the speed of a D.C. motor used to drive a vehicle such as a caddy cart where reliable control is necessary, if not essential, for safe operation.

It will be understood that the particular embodiment of the invention described herein is intended as an illustrative example of the invention and that the invention is not necessarily limited to such an embodiment. Although the particular embodiment of the invention was applied to a speed control circuit for a motor, it will be apparent the control circuit is readily adaptable to other applications where it is desired to control the power supplied to a load.

It will be also apparent many other modifications of the invention described herein may be made. It is to be understood, therefore, that I intend by the appended claim to cover all such modifications that fall within the true spirit and scope of the invention.

What I claim is new and desire to secure by Letters Patent of the United States is:

A speed control circuit for a motor having an armature and a field winding, said motor being operated from a direct current source, said speed control circuit comprising: an input means adapted for connection to the direct current source, a first controlled rectifier having an anode, a cathode and a gate, a transformer having a primary and a secondary, terminals adapted for connection to said armature and said field winding to supply power thereto, circuit means connecting said primary of said transformer and said terminals in the conducting path of said first controlled rectifier and with said input means, a first relaxation oscillator having an input connected across the first controlled rectifier and having its output connected in circuit with said gate of said first controlled rectifier, said first relaxation oscillator including a unijunction transistor having an emitter, a base-one and a base-two electrode, a variable resistor and a charging capacitor connected in circuit with the emitter electrode of said unijunction transistor, a Zener diode connected across the base-one and base-two electrodes thereof, said variable resistor controlling the frequency at which signals are provided at the output of said first relaxation oscillator, a communtating capacitor, a diode means, said commutating capacitor and said diode means being serially connected in circuit with the secondary of said transformer, said diode means being poled to conduct current to said commutating capacitor when said first controlled rectifier is in a conducting state, a second controlled rectifier having an anode, a cathode and a gate, said second controlled rectifier being connected in circuit with said commutating capacitor and said first controlled rectifier to cause said commutating capacitor to be discharged and stop conduction of said first controlled rectifier when said second controlled rectifier is turned on, a second relaxation oscillator having an input connected in the conducting path of said first controlled rectifier and having its output coupled with the gate of said second controlled rectifier, said second relaxation oscillator including a unijunction transistor having a base-one, a base-two and an emitter electrode, a serially connected resistor and a charging capaictor connected in circuit with the emitter electrode, and a Zener diode connected across the base-one and base-two electrodes, said second relaxation oscillator providing a signal at the gate of said second controlled rectifier a predetermined interval after said first controlled rectifier is switched on and said second relaxation oscillator being operative only when said first controlled rectifier is in a conducting state.

References Cited in the file of this patent
UNITED STATES PATENTS

| | | |
|---|---|---|
| 3,041,478 | Gabor | June 26, 1962 |
| 3,064,174 | Dinger | Nov. 13, 1962 |
| 3,103,616 | Cole et al. | Sept. 10, 1963 |

OTHER REFERENCES

Publication: GE SCR Manual, First Edition, Auburn, New York, 1960, pages 57, 58, 112–119, TK2798 G4g, 1960.